United States Patent
Sandhu et al.

[11] Patent Number: 5,838,445
[45] Date of Patent: Nov. 17, 1998

[54] METHOD AND APPARATUS FOR DETERMINING SURFACE ROUGHNESS

[75] Inventors: Gurtej S. Sandhu; Guy Hudson, both of Boise, Id.

[73] Assignee: Micron Technology, Inc., Boise, Id.

[21] Appl. No.: 804,526

[22] Filed: Feb. 21, 1997

Related U.S. Application Data

[63] Continuation-in-part of Ser. No. 474,310, Jun. 7, 1995.

[51] Int. Cl.⁶ ..................................................... C01B 11/30
[52] U.S. Cl. .......................... 356/371; 356/138; 356/150
[58] Field of Search .................................. 356/138, 371, 356/150

[56] References Cited

U.S. PATENT DOCUMENTS

| | | |
|---|---|---|
| 3,076,211 | 2/1963 | Cleversey . |
| 3,591,291 | 7/1971 | Greer et al. . |
| 3,602,596 | 8/1971 | Astheimer et al. . |
| 3,922,093 | 11/1975 | Dandliker et al. . |
| 3,971,956 | 7/1976 | Jakeman et al. . |
| 4,050,822 | 9/1977 | Grat ........................................ 356/171 |
| 4,101,891 | 7/1978 | Fletcher . |
| 4,133,204 | 1/1979 | Mittleman . |
| 4,148,027 | 4/1979 | Nowogrodzki . |
| 4,164,368 | 8/1979 | Miyata . |
| 4,211,276 | 7/1980 | Itoh et al. .................................... 165/1 |
| 4,290,698 | 9/1981 | Milana ..................................... 356/371 |
| 4,313,172 | 1/1982 | Ahmad et al. . |
| 4,511,800 | 4/1985 | Harbeke et al. ......................... 250/372 |
| 4,557,236 | 12/1985 | Showalter . |
| 4,573,131 | 2/1986 | Corbin . |
| 4,590,574 | 5/1986 | Edmonds et al. . |
| 4,665,739 | 5/1987 | Mizuno . |
| 4,874,426 | 10/1989 | Honda ..................................... 73/64.4 |
| 4,991,971 | 2/1991 | Geary et al. . |
| 5,080,484 | 1/1992 | Schneider et al. ...................... 356/154 |
| 5,189,481 | 2/1993 | Jann et al. ................................ 356/73 |
| 5,268,733 | 12/1993 | Wright et al. ........................... 356/150 |
| 5,312,211 | 5/1994 | Rodriguez . |
| 5,355,221 | 10/1994 | Brophy et al. . |
| 5,372,030 | 12/1994 | Astleford et al. . |

*Primary Examiner*—Richard A. Rosenberger
*Attorney, Agent, or Firm*—Fletcher, Yoder & Edwards

[57] ABSTRACT

A method for monitoring surface roughness by applying a controlled amount of liquid onto a specimen surface to form a liquid protrusion. The diameter or area of the a liquid protrusion is measured and correlated to surface roughness. In an alternative embodiment, the contact angle between the specimen surface and the liquid protrusion is measured. Surface roughness is computed from the contact angle measurement and several known physical constants of the liquid and specimen surface.

20 Claims, 1 Drawing Sheet

METHOD AND APPARATUS FOR DETERMINING SURFACE ROUGHNESS

CROSS-REFERENCE TO RELATED APPLICATIONS

This application is a continuation-in-part of application Ser. No. 08/474,310, filed Jun. 7, 1995, now abandoned.

BACKGROUND OF THE INVENTION

1. Field of the Invention

The present invention relates generally to a method and apparatus for determining surface roughness and, more particularly, to an inline method to monitor surface roughness of thin film deposition processes.

2. Statement of the Problem

Thin film materials, such as amorphous silicon, polysilicon, dielectrics, metals, and metal silicides, are of increasing importance in the manufacture of integrated circuits. Surface roughness of these thin films may affect electrical and mechanical performance of the integrated circuit. Hence, monitoring surface roughness is of particular importance in integrated circuit processing and manufacturing.

In the past, surface roughness was monitored by measuring the electrical characteristics of the thin film, where possible. For example, thin films of polysilicon could be patterned and etched to form capacitors. Capacitance was then measured and correlated to surface roughness. The processes of patterning, etching, and capacitance measurement added complexity, and sometimes inaccuracy, to the manufacturing process. Moreover, these extra steps caused processing delay as process lots of tens or hundreds of wafers awaited completion of the measurements. What is needed is a quick, accurate method for monitoring surface roughness that can be performed without delay, or inline, after a thin film deposition process.

U.S. Pat. No. 4,290,698, issued to Emilio Milana on Sep. 22, 1981, describes a surface roughness monitor using a laser scanned over the specimen surface. The Milana method measures intensity of the reflected beam to compute surface roughness. The Milana method requires that each reading be compared to a standard reading from a sample. Because the Milana method scans the specimen, it is not suited to measurements on small areas available in device wafers. Hence, the test requires complex optical equipment and must be used on test wafers rather than product wafers.

U.S. Pat. No. 4,511,800, issued to Harbeke et al. on Apr. 16, 1985, describes a surface roughness method for use in the semiconductor industry. The Harbeke et al. method is based upon optical reflectance measurements and, thus, requires somewhat complex arrangement of light sources, lenses, mirrors, and photodetectors. Like the Milana method, the Harbeke method relied on surface reflection, so it cannot be used on non-reflective surfaces.

3. Solution to the Problem

The above and other problems of prior art surface roughness measuring apparatus and methods are solved by an inline measurement method that is non destructive, can be performed in a small area, and is quickly performed. The method and apparatus of the present invention have simple construction and can be implemented with little or no equipment expense to an integrated circuit manufacturing facility. Because reflective measurements are not required, the method of the present invention is applicable to both reflective and non-reflective surfaces. The method is highly accurate and allows a more direct measurement of surface roughness as compared with the derivative measurements based upon reflectance used in the prior art.

SUMMARY OF THE INVENTION

Briefly stated, one embodiment of the present invention involves a method for monitoring surface roughness by applying a controlled amount of liquid onto a specimen surface to form a drop. The size of the drop is measured and correlated to surface roughness. In an alternative embodiment, the contact angle between the specimen surface and the drop is measured. Surface roughness is computed from the contact angle measurement and several known physical constants of the liquid and specimen surface.

DESCRIPTION OF THE SPECIFIC EMBODIMENTS

Figure 1:
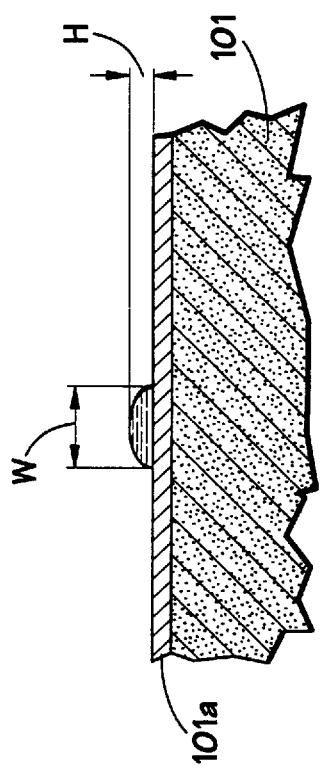
FIG. 1 illustrates in schematic form an apparatus in accordance with the present invention.

FIG. 1 illustrates basic features of an apparatus of a preferred embodiment for performing a method of the present invention. Substrate 101 is a semiconductor substrate that may optionally have circuitry and semiconductor devices formed thereon. For example, the substrate may be a layer of polysilicon. Substrate 101 may include one or more thin film layers or patterned features formed on an upper surface (shown as layer 101a in FIG. 2 and FIG. 3).

Dispenser 103 is provided to apply a drop of liquid 102 to the upper surface of substrate 101. In a first embodiment, it is desirable that the size and volume of drop 102 is carefully controlled so that it is repeatable from wafer to wafer as multiple wafers are processed. Delivery tube 104 provides and aims drop 102 at the upper surface of substrate 101 which is preferably held in a horizontal position so that drop 102 does not run or drip when applied to substrate 101.

Dispenser 104 delivers a controlled amount of liquid as determined by flow controller 105. Flow controller 105 can be any of a variety of well-known mass or volume flow control mechanisms. For crude measurements, it is possible to merely use an eyedropper to apply drop 102 or similar manual device. Although skilled technicians can control drop size using manual techniques, automated liquid delivery systems including a flow controller 105 are preferable in practice of the present invention.

Figure 2:
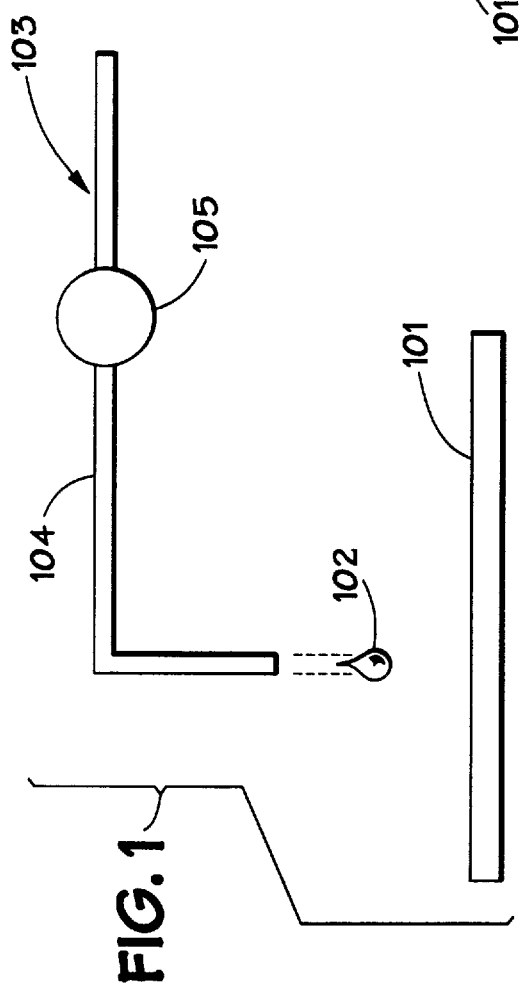
FIG. 2 illustrates a highly simplified, enlarged, cross-sectional view of an integrated circuit undergoing the measurement in accordance with the present invention.

Liquid 102 may comprise any liquid that is inert with respect to the surface 101 and which does not evaporate too quickly in the atmosphere surrounding the surface of substrate 101 to prevent an accurate measurement. Examples could be deionized water, glycol, a mixture of deionized water and glycol, oil, or organic compounds, such as photoresist, soap, or the like. Drop 102 may include some form of pigmentation. Preferably drop 102 should be of a material that forms a liquid protrusion by spreading in a repeatable manner as shown in FIG. 2 rather than a material that spreads freely or variably over surface of substrate 101. Similarly, a material that does not wet at all on the surface of substrate 101 may increase measurement difficulty. The material comprising drop 102 may or may not wet when it strikes a surface of substrate 101.

Figure 3:
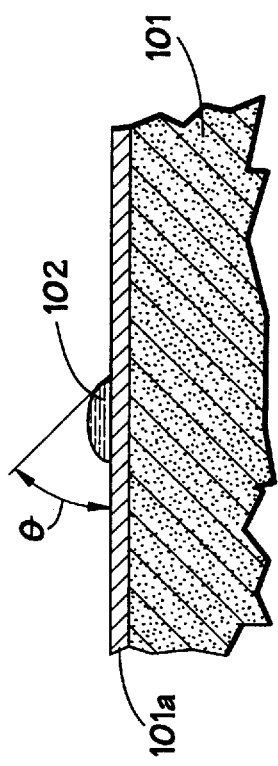
FIG. 3 illustrates a second embodiment method in accordance with the present invention.

Referring to FIG. 2, drop 102 falls onto the surface layer of substrate 101. In FIG. 2 and FIG. 3 surface layer 101a, which is a part of substrate 101, represents one or more surface layers or patterned features formed on a surface of substrate 101. For accuracy of measurement, drop 102 should be applied to a portion of substrate 101 that does not have three dimensional device features formed thereon as the three dimensional device features may complicate the surface roughness measurement and add inaccuracies.

As indicated by "W" in FIG. 2, drop 102 has a width or diameter as it rests on the surface of substrate 101. Drop 102 also has a height indicated by "H" in FIG. 2. Width and height of drop 102 are determined by many factors including the composition of the liquid making up drop 102, viscosity, surface tension, pressure, temperature, and the surface roughness of upper layer 101a of substrate 101. In an environment where the composition of drop 102 is controlled and known, and where pressure and temperature are controlled and known, the width and height of drop 102 as it rests on substrate 101 is a function of surface roughness of upper surface 101a.

In accordance with a first embodiment method of the present invention, surface roughness is determined by measuring width, height, or both width and height of drop 102 as it rests on substrate surface 101a. These can be measured by microscopes or measuring eye pieces that are well-known in the semiconductor industry. Alternatively, the measurement of width or height can be determined using a digital camera to capture an image of drop 102 from either above or on the side. The captured image is transferred to an image processing unit that extracts and edge image or edge information from the image of drop 102. This edge information can be further processed to calculate area, surface area, diameter, or the like.

Each of these measurements is a function of surface roughness. Specifically, the surface area A may be determined using the radius r of the drop, i.e., one half of the width w, by the formula:

$$A = \pi r^2.$$

The rougher the surface, the greater the surface area A. Because the size of the drop 102 is known and carefully controlled, the radius (or width or diameter) of the drop 102 decreases as surface roughness increases due to the greater surface area for a given radius.

Whether the measurement of width or height is taken manually, or automatically using a digital image processing system, the information is applied to a calibration memory to determine a value for surface roughness. In a preferred embodiment, the calibration memory is configured as a lookup table or content addressable memory that stores known factors and can be addressed by the width, height, area, diameter, or other measurement taken during the measurement step. The calibration memory outputs a value for surface roughness based upon the measured factors. The calibration memory may be initially programmed by measuring surface roughness using a prior art technique and storing the measurement at an address identified by a corresponding height, width, area, or other measurement.

For instance, the measured area A is compared to an upper limit and a lower limit to determine if the measured area A falls within a given range. The upper limit relates to a relatively smooth surface that produces a drop having a larger area, and the lower limit relates to a relatively rough surface that produces a drop having a smaller area. These upper and lower limits of drop area may be determined empirically by testing specimens of known roughness. The electrical properties of the semiconductor material are optimized if the roughness produces a drop area falling within this range.

In a second embodiment in accordance with the present invention, contact angle of the interface between drop 102 and surface 101a is measured as illustrated in FIG. 3. The contact angle theta is a measurement of the wetting properties of liquids on solid surfaces. Completely wetting liquids have a contact angle of zero degrees. Liquids having a contact angle zero degrees greater than or greater than ninety degrees are referred to as wetting and liquids having a contact angle greater than ninety degrees are referred to as poorly wetting or non-wetting.

Methods of measuring contact angle are well-known. A particular method is illustrated in U.S. Pat. No. 5,080,484 issued to Schneider et al. on Jan. 14, 1992. The method of the >484 patent may be applicable to the inline surface roughness method in accordance with the present invention. Other methods of measuring contact angle are known and may be used as well.

Surface roughness (r) can be calculated directly from the contact angle measurement where the surface force vectors $\gamma LV$, $\gamma SV$, and $\gamma SL$ are known using the equation:

$$r\gamma LV \cos(\theta) = \gamma SV - \gamma SL$$

where:

$\gamma LV$ is the force vector for a liquid-vapor interface;

$\gamma SV$ is the surface force vector for a solid-vapor interface;

$\gamma SL$ is the surface force vector for a solid-liquid interface; and $\theta$ is the measured contact angle.

This equation relating surface roughness and contact angle is described in greater detail in "Principles of Colloid and Surface Chemistry" by Paul C. Hiemnz and Marcel Dekker Inc., page 236 (1977).

Where these surface force vectors remain constant in a manufacturing environment, calibration memory can be dispensed with and replaced by a simple calculation of surface roughness from the measurement of contact angle.

Optionally, a calibration memory is also used in the second embodiment. In the second embodiment, the calibration memory stores, for example, the value of a force vector for a liquid vapor interface ($\gamma LV$), a value of a force vector for a solid vapor interface ($\gamma SV$), and a value of a surface force vector for a solid liquid interface ($\gamma SL$) for each type of expected surface layer 101a and liquid composition expected to be used for drop 102. These values would be determined based upon the particular characteristics and composition of surface layer 101a and the characteristics and composition of liquid drop 102. These values can be measured by known techniques and remain relatively constant with normal variations in the composition of surface layer 101a and liquid 102.

The calibration memory can be used to look up and output the relevant values for $\gamma LV$, $\gamma SV$, and $\gamma SL$ upon input of the material composition of surface layer 101 and the composition of liquid 102. Calibration memory may also use pressure and temperature readings in order to compensate for variable pressure and temperature during the measurement. Calibration memory, once addressed, outputs a value for $\gamma SV$ and $\gamma SL$, and $\gamma LV$ allowing calculation of surface roughness very quickly.

It should be understood that the preferred embodiments show only examples of how the method of the present invention can be practiced and should not be considered limitations thereof. It is to be expressly understood that features such as calibration memory can be implemented automatically or manually using any type of computer memory, or recording system appropriate for a look-up table use. Random access memory may also be used rather than content addressable memory. The image processing may be performed manually using calibrated microscopes or measuring eye pieces or may be performed automatically using known digital image processing techniques. Contact angle can be measured automatically or manually by known techniques. These and other modifications of the preferred embodiment are considered equivalent and within the scope and spirit of the inventive concept.

We claim:

1. A method for determining surface roughness of a semiconductor substrate, said method comprising the steps of:
    (a) applying a controlled amount of liquid onto a surface of said semiconductor substrate to form a drop, said drop having an area and a contact angle;
    (b) measuring the area of the drop; and
    (c) correlating the area of the drop to roughness of said surface without determining the contact angle of the drop.

2. The method of claim 1 wherein the liquid comprises a substance that is chemically inert with respect to the surface.

3. The method of claim 2 wherein the liquid comprises glycol.

4. The method of claim 1 wherein steps (a) and (b) are performed on production wafers having integrated circuit components formed thereon.

5. The method of claim 1 wherein step (a) comprises the step of:
    using a flow controller coupled to a delivery tube to apply said controlled amount of liquid onto said semiconductor substrate.

6. The method of claim 1 wherein step (b) comprises the step of:
    viewing said drop with a microscope to measure said area of said drop.

7. The method of claim 1 wherein step (b) comprises the steps of:
    digitally capturing an image of said drop; and
    digitally processing said image to determine said area of said drop.

8. The method of claim 1 wherein step (c) comprises the step of:
    determining whether said area falls within a given range.

9. A method for monitoring surface roughness comprising the steps of:
    (a) applying a drop of liquid onto a specimen surface to form a drop on the surface, said drop having a diameter and a contact angle;
    (b) measuring said diameter of said drop;
    (c) calculating an area of said specimen surface covered by said drop; and
    (d) correlating said area to roughness of said specimen surface without determining the contact angle of the drop.

10. The method of claim 9 wherein the liquid comprises a substance that is chemically inert with respect to said specimen surface.

11. The method of claim 9 wherein the liquid comprises glycol.

12. The method of claim 9 wherein steps (a) and (b) are performed on production wafers having integrated circuit components formed thereon.

13. The method of claim 9 wherein step (a) comprises the step of:
    using a flow controller coupled to a delivery tube to apply said controlled amount of liquid onto said semiconductor substrate.

14. The method of claim 9 wherein step (b) comprises the step of:
    viewing said drop with a microscope to measure said diameter of said drop.

15. The method of claim 9 wherein step (b) comprises the steps of:
    digitally capturing an image of said drop; and
    digitally processing said image to determine said diameter of said drop.

16. The method of claim 9 wherein step (c) comprises the step of:
    calculating said area using a formula $A=\pi r^2$, where A is said area and r is one half of said diameter.

17. The method of claim 9 wherein step (d) comprises the step of:
    determining whether said area falls within a given range.

18. An apparatus for measuring surface roughness of a specimen comprising:
    a support for supporting said specimen;
    a liquid dispenser for applying a predetermined quantity of liquid onto a surface of said specimen to form a drop;
    means for determining an area of said surface covered by said drop; and
    means for correlating said area directly to roughness of said surface.

19. The apparatus of claim 18 wherein the means for determining comprises a microscope.

20. The apparatus of claim 18 wherein the means for determining comprises:
    a digital camera aimed to view the drop; and
    an image processor coupled to receive a digital signal from the digital camera, wherein the image processor is programmed to acquire an image of the drop, extract an edge image from the image of the drop, and compute the area of the drop from the edge image.

* * * * *